June 30, 1936.  F. J. BALL  2,046,236

GARDEN FLAT

Original Filed Nov. 9, 1933

Inventor,
Francis J. Ball,
by J. Stuart Neeman,
Attorney.

Patented June 30, 1936

2,046,236

UNITED STATES PATENT OFFICE 2,046,236

GARDEN FLAT

Francis J. Ball, Willow Grove, Pa., assignor of two-thirds to Charles M. Biddle, 3d, Riverton, N. J.

Refiled for abandoned application Serial No. 697,354, November 9, 1933. This application October 9, 1935, Serial No. 44,243

10 Claims. (Cl. 47—37)

The object of the invention is to provide improvements in garden flats, or that type of boxes in which seeds, seedlings and small plants are grown, and from which they are eventually dispensed or transplanted.

As far as is known garden flats have always been used in the form of shallow, generally rectangular boxes, without covers, and in these the seedlings and small plants have been grown initially in a single body of earth or loam, or into which seedlings and small plants have been transferred for shipment and dispensing, each such seedling or plant being independently rooted in individual containers. However, as the sides of these flats have always been fixedly secured, great difficulty has been uniformly experienced in extracting the first few seedlings or plants from the flat, either from the original soil body or in individual paper (or similar) pot-like container.

Another object therefore is to provide an improved flat having at least one side hingedly or oscillatably mounted, so as to permit its being easily raised at one end or both, or entirely removed, in order to permit the ready removal of the first few seedlings or plants laterally from the flat, or in other words in a direction substantially parallel with the bottom of the same, after which it becomes an easy matter to remove from the flat the remaining articles, irrespective of the position or even the presence of the movable side wall.

A further object is to provide in a device of this character, the combination of a flat having a movable or removable side wall, in combination with a top closure or cover of glass and frame construction, said cover being preferably angularly adjustable with respect to the remainder of the flat, and also entirely removable therefrom if so desired, together with the provision of means to maintain said cover in any one of a plurality of predetermined adjustable positions, in order to accommodate the flat, which has thereby become a miniature hot-house or cold frame, and the condition of its internal atmosphere to external temperature and other atmospheric conditions, including frost, humidity, wind direction and intensity, etc.

With these objects in mind, the invention comprises further details of construction and operation, which are hereinafter fully brought out in the following description, when read in conjunction with the accompanying drawing in which Fig. 1 is a perspective view of a garden flat comprising one embodiment of the invention;

Figures 1, 2, 3, 4, 5, 6, 7:
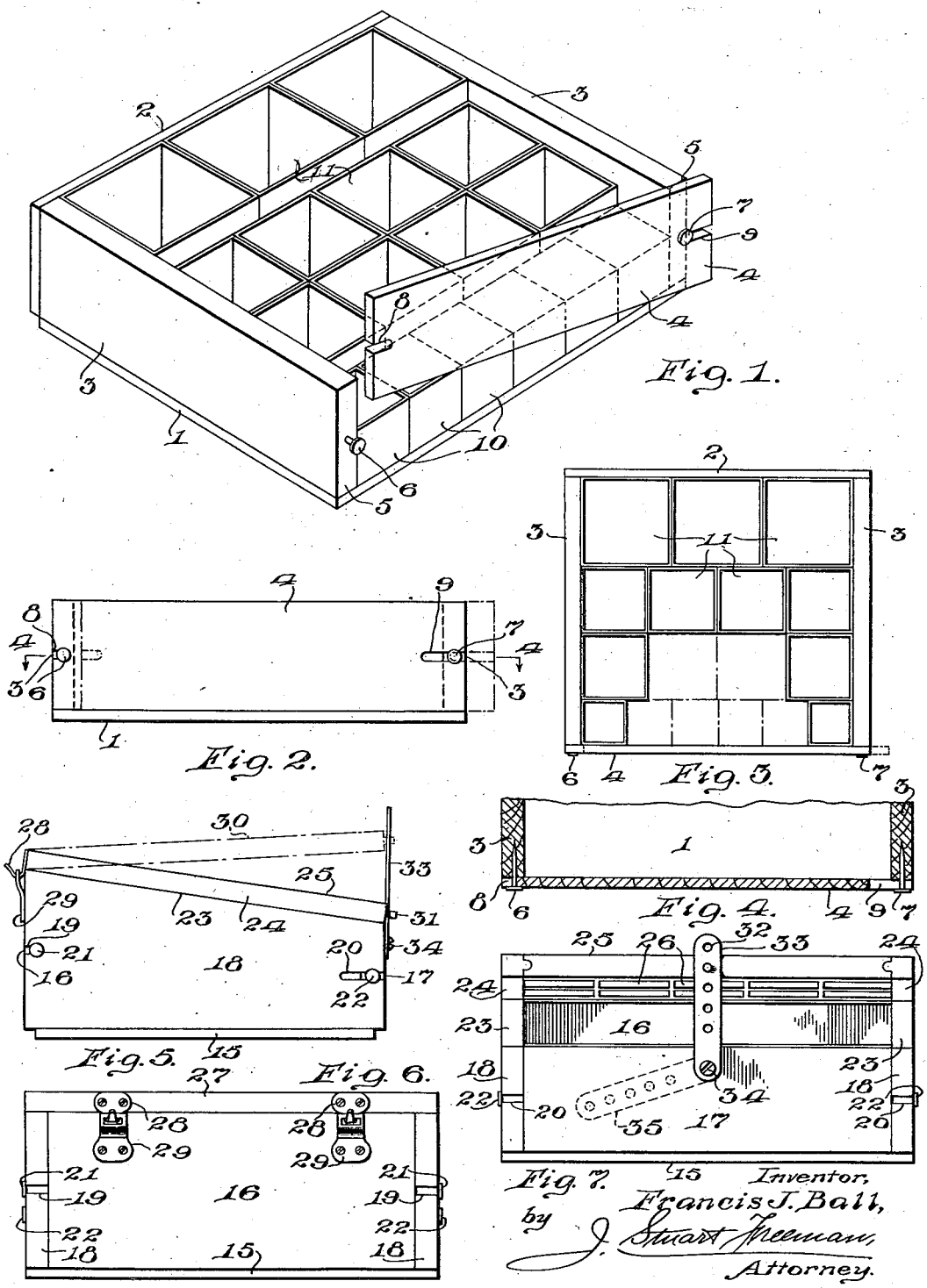
Fig. 2 is a front elevation of the same.
Fig. 3 is a top plan view of the same.
Fig. 4 is a fragmentary sectional view on the line 4—4 of Fig. 2.
Fig. 5 is a side elevation of a somewhat modified form of the device.
Fig. 6 is a rear elevation of the same.
Fig. 7 is a front elevation of the same.

Referring to Figs. 1 to 4 inclusive, the improved flat comprises a bottom wall 1, rear and side walls 2 and 3, respectively, fixedly secured together, and a front wall 4, which is both oscillatable with respect to and detachably supported by the forward end portions of said side walls. Into each of the forward surfaces 5 of said side walls 3 is secured any suitable supporting means, such as a stout pin, nail, screw, or the like 6 and 7, while the opposite end portions of said front wall 4 are provided respectively with slots 8 and 9, which slots extend inwardly from the opposite ends of said front wall, and are preferably in substantial alignment with each other, the last-named slot 9 also preferably being of greater inward extent than the former slot 8, and said supporting means normally extending thru said slots.

With this construction, the said forward wall is normally in the operative or closed position shown in Fig. 2, with the pin 7 extending thru the outer free portion of the slot 9, while the pin 6 extends thru the inner end portion of the other slot 8. In order to release said forward wall so that it can be oscillated angularly into a position such as that shown in Fig. 1, or entirely removed from the remaining portions of the flat, said forward wall is first shifted longitudinally into the position indicated by the dot-and-dash lines in Fig. 2, after which it may be oscillated about the pin 7 as a pivot, since in this position the opposite end of said forward wall is entirely free from the pin 6. After assuming the position shown in Fig. 1, which permits one or more of the paper or other form of pot-like containers 10 being readily withdrawn horizontally from said flat, said forward wall may then be shifted diagonally outwardly in alignment with its own axis above and free from the pin 6, until the sides of the slot 9 are in complete disengagement from the pin 7. Thereafter additional containers may be removed also horizontally from the flat, after which the remaining containers 11 of the same or different sizes may be removed either vertically, or horizontally, or diagonally, as may be desired, by lifting them directly or by placing a trowel or the like beneath them. Obviously said front wall can be replaced in operative position in the inverse order of movement to that hereinbefore described.

Referring now to Figs. 5, 6 and 7, a slightly modified form of garden flat is shown as comprising a bottom wall 15, rear wall 16 and a forward wall 17, said rear and forward walls being fixedly secured to said bottom wall. In addition, either or both of the laterally opposite sides of said flat may be inclosed by a wall member 18, which is provided at its opposite ends with relatively short and long slots 19 and 20, receiving and cooperating with pins or the like 21 and 22, respectively, the same as hereinbefore described. The upper edge portions of the said walls 18 preferably slant downwardly as they progress forwardly, to provide normal supporting surfaces 23 for the laterally opposite edge portions 24 of a frame 25 containing glass or other form of light-admitting and diffusing sections 26.

The rear edge portion 27 of said frame 25 is provided with one or more hooked or other suitable form of fixtures 28, which interengage with eyelet fixtures 29, secured to said rear wall 16, it being obvious in this construction that the frame 25, while normally resting uniformly upon the rear, front and side walls of the flat, in order to provide a cover and closure therefor, may be elevated angularly into any one of a plurality of vertically adjustable positions, as indicated by the dot-and-dash lines 30, and secured in the desired angular position by engagement of a pin or lug 31, carried by the forward free edge portion of such closure, with any one of the apertures 32 in a link 33, or other form of support, the opposite end portion of which latter is pivotally connected by suitable means 34 with the front walls 17. With this construction, such support may assume the operative position shown in Fig. 7, or when not in use, as when the closure is in its lowermost position, it assumes the dotted line position 35 of said Fig. 7.

It will be noted that the second or modified form of flat possesses all of the advantages of the form first described, in that the angular shifting and removal if desired of either or both of the said walls 18 permits the horizontal removal of those seedlings or plants first to be removed from within the flat, and in addition thereto possesses all of the desirable characteristics of any cold frame, miniature hot-house, and equivalent devices for the germination and growth of seeds, and for the forcing and protection of seedlings, before the season progresses sufficiently to permit seedlings to be transplanted into the open ground with safety.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim as new and desire to secure by Letters Patent is:—

1. A garden flat comprising a pair of oppositely positioned walls, a wall normally extending between said first walls, means to pivotally connect said last wall with one of said first walls, and means to oscillatably connect said wall with the other of said first walls.

2. A garden flat, comprising a pair of oppositely positioned walls, a wall normally extending between said first walls and provided with slots extending inwardly from its opposite ends, and pins carried by said first walls and normally extending thru said slots to secure said connecting wall to said first walls, and permit oscillation of said last-mentioned wall with respect to said first walls until free from engagement with one of said first walls, after which said last-mentioned wall is adapted to swing with respect to the other of said first walls in a plane perpendicular to said first walls.

3. A garden flat, comprising a pair of oppositely positioned walls, a wall normally extending between said first walls and provided with slots extending inwardly from its opposite ends, one of said slots being of greater length than the other slot, and pins carried by said first walls and normally extending thru said slots to secure said connecting wall to said first walls, and permit oscillation of said last-mentioned wall with respect to said first walls until the shorter slot is free from engagement with the pin carried by one of said first walls, after which said last-mentioned wall is adapted to swing with respect to the other of said first walls in a plane perpendicular to said first walls, about a pivot defined by the other pin extending thru a shifted position in the longer of said slots.

4. A garden flat, comprising a pair of side walls connected by a bottom wall, a front wall normally extending between the forward portions of said side walls, a pin secured to the forward portion of each of said side walls, and slots in the opposite end portions of said front wall thru which said pins normally extend, one of said slots having an open end, to permit the escape of one of the pins therefrom, as said front wall is shifted substantially longitudinally in the plane common to said side walls, after which said front wall is free to be shifted angularly in a plane angularly disposed with respect to that which is common to said side walls.

5. A garden flat, comprising a pair of side walls connected by a bottom wall, a front wall normally extending between the forward portions of said side walls, a pin secured to the forward portion of each of said side walls, and slots in the opposite end portions of said front wall thru which said pins normally extend, the ends of said slots being open, to permit the escape of one of the pins therefrom, as said front wall is shifted substantially longitudinally in the plane common to said side walls, after which said front wall is free to be shifted angularly in a plane angularly disposed with respect to that which is common to said side walls, after which said front wall is free to be detached from the other of said pins by longitudinal movement of said front wall past said first pin.

6. A garden flat, comprising a forward and a rear wall, each of which is provided in its ends with pins, side walls, each of which is provided with slots thru which said pins normally extend, each side wall adapted to be shifted longitudinally upon one pin until it disengages the other pin, after which that side wall can be oscillated upon the first pin until out of alignment with the second pin, after which that side wall can be shifted longitudinally free from the first pin.

7. A garden flat, comprising a forward and a rear wall, each of which is provided in its ends with pins, side walls, each of which is provided with slots thru which said pins normally extend, each side wall adapted to be shifted longitudinally upon one pin until it disengages the other pin, after which that side wall can be oscillated upon the first pin until out of alignment with the second pin, after which that side wall can be shifted longitudinally free from the first pin, and a cover pivotally connected to one of the front and rear walls and normally resting upon the other of said first-named walls and upon said side walls.

8. A garden flat, comprising a forward and a rear wall, each of which is provided in one of its ends with a pin, and a side wall provided in its ends with slots opening generally away from each other and thru which slots said pins normally extend, said side wall adapted to be shifted longitudinally upon one pin until it disengages the other pin, after which said side wall can be oscillated upon the first pin until out of alignment with the second pin, after which said side wall can be shifted longitudinally free from the first pin.

9. A garden flat, comprising a forward and a rear wall, each of which is provided in one of its ends with a pin, and a side wall provided in its ends with slots opening generally away from each other and thru which slots said pins normally extend, said side wall adapted to be shifted longitudinally upon one pin until it disengages the other pin, after which said side wall can be oscillated upon the first pin until out of alignment with the second pin, after which said side wall can be shifted longitudinally free from the first pin, and a cover pivotally connected to one of the front and rear walls and normally resting upon the other of said last-mentioned walls and upon said side wall.

10. A garden flat, comprising a pair of walls fixedly connected by a third wall, a fourth wall normally extending between said pair of walls and being provided with slots in its opposite ends, one of which slots opens thru an edge portion of the wall, and a pin carried by each of said pair of walls and normally extending thru said slots, said slotted wall being movable upon one pin until said last-mentioned wall is free from the other pin, after which that wall can be shifted free from the first pin.

FRANCIS J. BALL.